(12) United States Patent
Graute et al.

(10) Patent No.: US 12,448,821 B2
(45) Date of Patent: Oct. 21, 2025

(54) MOTOR VEHICLE LOCK FOR A LOCKING ELEMENT OF A MOTOR VEHICLE

(71) Applicant: Brose Schliesssysteme Gmbh & Co. Kommanditgesellschaft, Wuppertal (DE)

(72) Inventors: Ludger Graute, Essen (DE); Thomas Klemmstein, Moenchengladbach (DE); Arkadi Bogorats, Haan (DE)

(73) Assignee: Brose Schliesssysteme GmbH & Co. Kommanditgesellschaft, Wuppertal (DE)

( * ) Notice: Subject to any disclaimer, the term of this patent is extended or adjusted under 35 U.S.C. 154(b) by 91 days.

(21) Appl. No.: 18/122,256

(22) Filed: Mar. 16, 2023

(65) Prior Publication Data

US 2023/0295964 A1 Sep. 21, 2023

(30) Foreign Application Priority Data

Mar. 16, 2022 (DE) ...................... 10 2022 106 081.0

(51) Int. Cl.
*E05B 81/14* (2014.01)
*E05B 15/04* (2006.01)
*E05B 85/26* (2014.01)

(52) U.S. Cl.
CPC .............. *E05B 81/14* (2013.01); *E05B 15/04* (2013.01); *E05B 85/26* (2013.01); *E05B 2015/0403* (2013.01)

(58) Field of Classification Search
CPC .......... E05B 81/14; E05B 81/00; E05B 81/20; E05B 81/64; E05B 15/04; E05B 85/26; E05B 2015/0403; Y10T 292/1082; Y10T 292/1047
See application file for complete search history.

(56) References Cited

FOREIGN PATENT DOCUMENTS

| DE | 10336418 | 3/2005 | | |
|----|----------|--------|---|---|
| DE | 102006052773 | 5/2008 | | |
| DE | 202008005016 | 8/2009 | | |
| DE | 102017124530 | 4/2019 | | |
| DE | 102017124530 A1 * | 4/2019 | ............ | E05B 77/36 |

* cited by examiner

*Primary Examiner* — Christine M Mills
*Assistant Examiner* — Yahya Sidky
(74) *Attorney, Agent, or Firm* — Pauly, DeVries Smith & Deffner LLC

(57) ABSTRACT

A lock for a closure element and comprises a locking-mechanism arrangement having a latch, a catch and a catch-switching lever, wherein the latch can be pivoted, about a latch axis, into at least one locking position, in each of which it is retained in engagement with a locking part, and into an open position wherein the catch can be pivoted into an engagement position, in which the latch located in the respective locking position is locked by the catch so that it cannot pivot, about a catch axis, in its opening direction, and a disengagement position, in which the catch frees the latch in its opening direction, and wherein the catch-switching lever can be pivoted, about a catch-pivoting-lever axis, into an actuating position, in which a sensor is activated by the catch-switching lever, and into a neutral position, in which the sensor is not actuated by the catch-switching lever.

8 Claims, 2 Drawing Sheets

MOTOR VEHICLE LOCK FOR A LOCKING ELEMENT OF A MOTOR VEHICLE

CLAIM OF PRIORITY

This application claims the benefit of German Patent application No. DE 10 2022 106 081.0 filed on Mar. 16, 2022, the disclosure of which is incorporated herein by reference.

FIELD OF THE TECHNOLOGY

Various embodiments relate to a motor-vehicle lock for a closure element of a motor vehicle.

BACKGROUND

The known motor-vehicle lock (DE 103 36 418 A1) from which the disclosure proceeds has a locking-mechanism arrangement having a latch and a catch. The latch can be pivoted into at least one locking position, in particular a main locking position and possibly a preliminary locking position, in which it is retained in engagement with a locking part, and into an open position, in which it frees the locking part. The catch can be pivoted into an engagement position, in which the latch located in the respective locking position is locked by the catch so that it cannot pivot in its opening direction, and a disengagement position, in which the catch frees the latch in its opening direction. The catch is coupled to the latch via a spring element such that the latch is prestressed in the direction of its main locking position and the catch is prestressed in the direction of its engagement position. It is possible for the catch to be retained in its disengagement position by a latch-in lever and to be transferred into its engagement position again by the spring element.

DE 10 2017 124 530 A1 discloses a further motor-vehicle lock in which the locking-mechanism arrangement, in addition to a latch and a catch, also has a catch-switching lever, which actuates, or does not actuate, a sensor in dependence on the catch position.

A spring element is arranged here between the catch and the catch-switching lever such that pivoting of the catch-switching lever causes the catch to disengage. The latch, which is prestressed into its open position via a further spring element, is pivoted into its open position in this way.

SUMMARY

The challenge here is to improve the known prior art.

The problem on which the disclosure is based is to configure, and develop, the known motor-vehicle lock so as to achieve further optimization in respect of the aforementioned challenge.

The above problem is solved by the features of various embodiments disclosed herein.

The motor-vehicle lock in question can be assigned to any closure element of a motor vehicle. The term "closure element" can be interpreted in broad terms here. It covers, for example, a side door, a rear door, a tailgate, a boot lid, an (engine) bonnet or the like. The closure element can be articulated on the bodywork of the motor vehicle in a manner similar to a pivoting door or a sliding door.

One aspect is the basic consideration of using a single spring element to exert a force on the functional components of the locking-mechanism arrangement. The term "functional component" can be understood in broad terms here and covers all those components of a motor-vehicle lock which are involved in the mechanical locking function of the locking-mechanism arrangement. Using a single spring element allows the motor-vehicle lock to be of straightforward construction since the support has to be provided for just one spring element. At the same time, high-level functionality is realised for the spring element, and this makes a compact and cost-effective construction of the motor-vehicle lock possible. In contrast to the known prior art, there is therefore no longer any need for more than one spring element, and this can result in cost-related savings being achieved.

In specific terms, it is proposed that the locking-mechanism arrangement has a common spring element, and that the common spring element is arranged such that the spring element exerts a spring force on the latch, the catch and the catch-switching lever.

Various embodiments provide a motor-vehicle lock which is intended for a closure element of a motor vehicle and comprises a locking-mechanism arrangement, wherein the locking-mechanism arrangement has, as its functional elements, a latch, a catch and a catch-switching lever, wherein the latch can be pivoted into at least one locking position, in particular a main locking position and possibly a preliminary locking position, in each of which it is retained in engagement with a locking part, and into an open position, in which it frees the locking part, wherein the catch can be pivoted into an engagement position, in which the latch located in the respective locking position is locked by the catch so that it cannot pivot in its opening direction, and a disengagement position, in which the catch frees the latch in its opening direction, and wherein the catch-switching lever can be pivoted into an actuating position, in which a sensor is activated by the catch-switching lever, and into a neutral position, in which the sensor is not actuated by the catch-switching lever, characterized in that the locking-mechanism arrangement has a common spring element, and in that the common spring element is arranged such that the spring element exerts a spring force on the latch, the catch and the catch-switching lever.

In various embodiments, the catch-switching lever is designed in the form of a multifunctional part which, in addition to performing a switching function in relation to a sensor for establishing the catch position, causes force to be transmitted from the spring element to the catch and provides support for the spring element.

In various embodiments, the spring element is supported, on the one hand, on the latch and, on the other hand, on the catch-switching lever such that the latch and the catch-switching lever are prestressed in relation to one another.

In various embodiments, the latch is prestressed into its open position, and in that the catch is prestressed into its engagement position, such as that the catch-switching lever is prestressed into its actuating position.

In various embodiments, the force generated by the common spring element, and acting on the catch and the latch, decreases as opening of the latch increases.

BRIEF DESCRIPTION OF THE DRAWINGS

Various aspects will be explained in more detail hereinbelow with reference to a drawing, which illustrates just one exemplary embodiment and in which.

DETAILED DESCRIPTION

Figure 1:
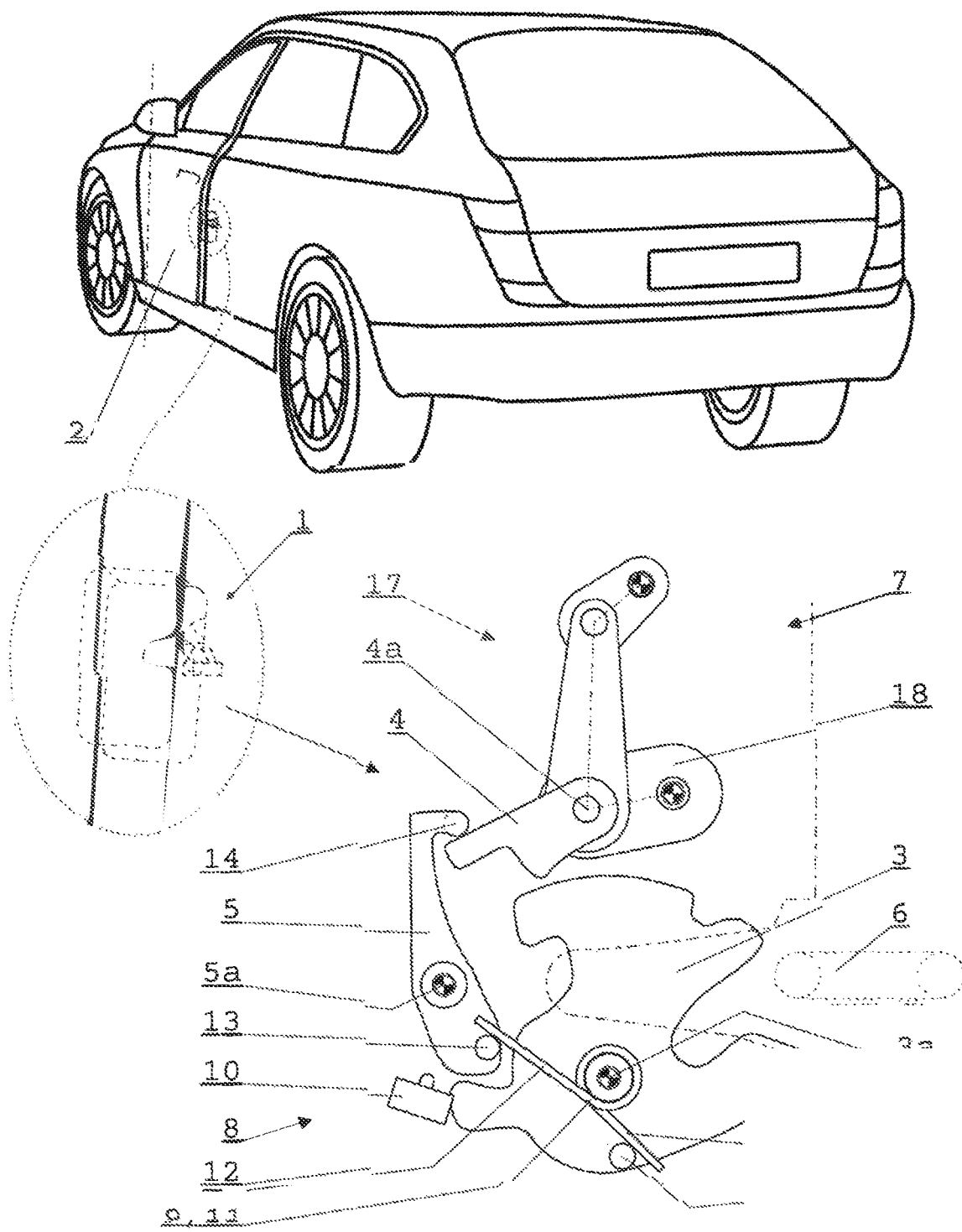
FIG. 1 shows a motor vehicle with a motor-vehicle lock according to the proposal having a latch which is located in the open position.

FIG. 1 illustrates, by way of example, a motor vehicle with a motor-vehicle lock 1 of an open motor-vehicle door, which forms the closure element 2. The motor-vehicle lock 1 has, as its functional elements, a latch 3, a catch 4 and a catch-switching lever 5, wherein the latch 3 can be pivoted, about a latch axis 3a, into at least one locking position, in particular a main locking position and possibly a preliminary locking position, in each of which it is retained in engagement with a locking part 6, and into an open position, in which it frees the locking part 6.

In the case of the exemplary embodiment which is illustrated here, the motor-vehicle lock 1 is assigned to a closure element 2 of the motor vehicle, in this case the side door illustrated, whereas the locking part 6 is assigned to the bodywork of the motor vehicle.

However, it is also conceivable, in principle, for these to be arranged the other way round.

As mentioned above, the relevant motor-vehicle lock 1 according to the proposal can be assigned to any closure element 2 of a motor vehicle. Also included here, in addition to side doors, are tailgates, boot lids, bonnets, in particular engine bonnets, or the like. Everything which is said here applies correspondingly to all other types of closure element 2.

The motor-vehicle lock 1 has a catch 4, which interacts with the latch 3, is mounted for pivoting about a catch axis 4a and can be moved, in particular pivoted, about a catch axis 4a into an engagement position and a disengagement position. In the engagement position, the catch 4 is in engagement with the latch 3, and thereby locks the latch 3 located in the respective locking position so that it cannot pivot in its opening direction. In the disengagement position, the catch 4 frees the latch 3 in its opening direction.

The catch-switching lever 5 can be pivoted, about a catch-switching lever axis 5a, from an actuating position, in which a sensor is actuated by the catch-switching lever 5, and into a neutral position, in which the sensor is not actuated by the catch-switching lever 5. The sensor here is designed to sense the position of the catch 4 indirectly via the catch-switching lever 5.

Provision is made in this case, for an electromotive opening drive (not illustrated in the figures), which can pivot the catch 4, using motor power, from its engagement position into its disengagement position. For this purpose, it is possible for a lever system 7, which is shown in the figures, to be arranged between the catch 4 and the opening drive, and this lever system causes the catch 4 to be disengaged.

The exemplary embodiment which is illustrated in the figures, relates to a motor-vehicle lock 1 which is intended for a closure element 2 of a motor vehicle and comprises a locking-mechanism arrangement 8, wherein the locking-mechanism arrangement 8 has a latch 3, a catch 4 and a catch-switching lever 5, wherein the latch 3 can be pivoted, about a latch axis 3a, into at least one locking position, in particular a main locking position and possibly a preliminary locking position, in each of which it is retained in engagement with a locking part 6, and into an open position, in which it frees the locking part 6, wherein the catch 4 can be pivoted into an engagement position, in which the latch 3 located in the respective locking position is locked by the catch 4 so that it cannot pivot, about a catch axis 4a, in its opening direction, and a disengagement position, in which the catch 4 frees the latch 3 in its opening direction, and wherein the catch-switching lever 5 can be pivoted, about a catch-pivoting-lever axis 5a, into an actuating position, in which a sensor is activated by the catch-switching lever 5, and into a neutral position, in which the sensor is not actuated by the catch-switching lever 5.

The key factor, then, is that the locking-mechanism arrangement 8 has a common spring element 9, and that the common spring element 9 is arranged such that the spring element 9 exerts a spring force on the latch 3, the catch 4 and the catch-switching lever 5.

The expression "exerts a spring force" can be understood in broad terms here and covers spring force generated by the common spring element 9 being transmitted both directly and indirectly to a functional element.

Provision of the common spring element 9 means that only a single spring element 9 is necessary for prestressing the functional elements of the locking-mechanism arrangement 8, so that any further spring elements can be dispensed with, this resulting in a straightforward and cost-effective construction of the locking-mechanism arrangement 8. In this way, the functional elements are each subjected to a force such that unwanted pivoting of the functional elements is prevented as is, therefore, an undesirable development of noise.

In the embodiment which is shown in figures, provision is made for the common spring element 9 to exert a force on all the functional elements of the locking-mechanism unit, that is to say on all of those components which are involved in the mechanical locking function of the locking-mechanism arrangement 8.

Provision is also made in this case, for the catch-switching lever 5 to be designed in the form of a multifunctional part which, in addition to performing a switching function in relation to a sensor 10 for establishing the catch position, causes force to be transmitted from the spring element 9 to the catch 4 and provides support for the spring element 9.

Figure 2:
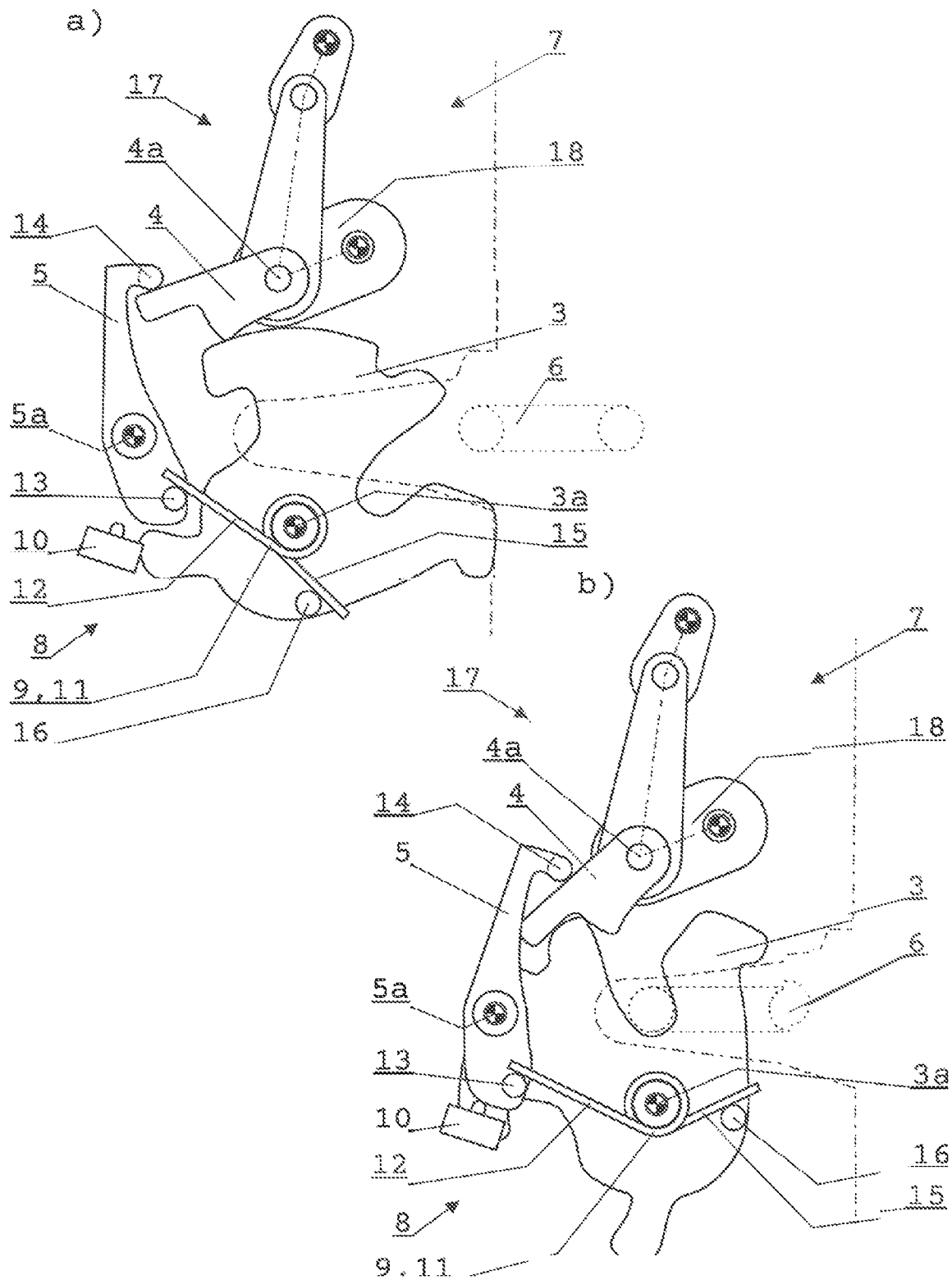
FIG. 2 shows the motor-vehicle lock from FIG. 1 a) as the latch is being transferred from the open position into its locking position and b) with the latch located in its locking position.

It is the case here that the catch-switching lever 5, as it pivots into its actuating position, actuates the sensor 10, which is shown in FIG. 1 and FIG. 2—that is to say a corresponding sensor signal is generated thereby—by which means the engagement position of the catch 4 is detected. In addition, the catch-switching lever 5 has a further function, namely that of transmitting the spring force of the common spring element 9 to the catch 4. This is realised here by the catch-switching lever 5 being in permanent engagement with the catch 4, as is shown in the figures. In addition, the catch-switching lever 5 also has a third function—that of providing support for the common spring element 9, as is shown in the figures. This achieves high-level functionality, as a result of which the motor-vehicle lock 1 is of particularly straightforward and compact construction.

In the embodiment which is shown in the figures, the common spring element 9 is designed in the form of a leg spring 11, wherein a first leg 12 of the leg spring 11 butts against a stop element 13 of the catch-switching lever 5.

Provision is also made in this case, for the spring element 9 to be supported, on the one hand, on the latch 3 and, on the other hand, on the catch-switching lever 5 such that the latch 3 and the catch-switching lever 5 are prestressed in relation to one another.

The expression "prestressed in relation to one another" can be understood in broad terms here and, in this case, means that, irrespective of the position of the latch 3 and the position of the catch-switching lever 5, the common spring element 9, at any one time, exerts a force directly on these two functional elements—the latch 3 and catch-switching lever 5. Since the catch-switching lever 5 is in engagement with the catch 4 the functional elements constituted by the latch 3, catch 4 and catch-switching lever 5 are thus subjected, irrespective of their position, to a force exerted by the common spring element 9. There is then advantageously no need for the spring element 9 to exert a force directly on the catch 4.

Provision is also made in this case, for the latch 3 to be prestressed into its open position, and for the catch 4 to be prestressed into its engagement position. In the embodiment which is shown in the figures, provision is also made in this case, for the catch-switching lever 5 to be prestressed into its actuating position.

The common spring element 9 here subjects the latch 3 to a force which prestresses the latch 3 into its opening position. In this way, the latch 3 can pivot automatically into its open position, in order to free the locking part 6, when the catch 4 is pivoted from its engagement position (FIG. 2b)) into its disengagement position (FIG. 1). At the same time, the common spring element 9 exerts a force on the catch 4 via the catch-switching lever 5, as a result of which the catch 4 is prestressed into its engagement position. For this purpose, the catch-switching lever 5 has a guiding element 14, which is in engagement with the catch 4. This spring force consequently counteracts unwanted pivoting of the catch 4 from its engagement position, and a high level of operational reliability of the locking-mechanism arrangement 8 is achieved as a result.

As is shown in the figures, the first leg 12 of the leg spring 11 butts against a stop element 13 of the catch-switching lever 5, as a result of which the catch-switching lever 5 is prestressed, in the clockwise direction in the figures, into its actuating position. The catch-switching lever 5 has a guiding element 14, which is in engagement with the catch 4. In this way, the catch 4 is prestressed in the direction of its engagement position via the catch-switching lever 5. The leg spring 11 therefore exerts a force on the catch 4 indirectly via the catch-switching lever 5. The leg spring 11 has a second leg 15, which butts against a protrusion 16 of the latch 3. This results in the latch 3 being prestressed, in the clockwise direction in the figures, into its open position.

Provision is also made in this case, for the force generated by the common spring element 9, and acting on the catch 4 and the latch 3, to decrease as opening of the latch 3 increases.

The expression "as opening increases" can be understood here to mean that the latch 3 is pivoted to an increasing extent from its locking position into its open position, wherein the opening of the latch 3 is regarded as starting from its locking position, in this case, from its main locking position.

FIG. 2b) shows the locking-mechanism arrangement 8 with the latch 3 located in its main locking position. The common spring element 9 here exerts a force on the latch 3, the catch-switching lever 5 and the catch 4. If the catch 4 is then pivoted into its disengagement position, as is shown for the transfer from FIG. 2b) to FIG. 1, the latch 3 is freed, as a result of which the latch 3, on account of its prestressing, is transferred into its open position, which is shown in FIG. 1. The disengagement of the catch 4 at the same time also causes the catch-switching lever 5 to be pivoted from its actuating position into its neutral position, to be precise counter to the spring force acting on it. As FIG. 2a) shows, the spring element 9 is subjected to less pronounced stressing when the latch 3 is located in its open position, so that the force from the common spring element 9 which acts on the latch 3, the catch 4 and the catch-switching lever 5 is lower than in the case of the locking-mechanism arrangement 8 which is shown in FIG. 2b), with the latch 3 located in its locking position.

This has the advantage that the catch 4 is easier to disengage by motor power, since the spring element 9 exerts a lower force on the catch 4 as opening of the latch 3 increases. As soon as the catch 4 frees the latch 3, the force required for retaining the catch 4 is lower, this force being minimal when the latch 3 is located in its open position. At the same time, the operation of transferring the latch 3 into its locking position is simplified since the latch 3 has to be pivoted counter to an increasing force, the operation of pivoting the latch 3 from its open position taking place in the first instance counter to a lower force.

In the embodiment which is shown in the figures, provision is made for the latch axis 3a, the catch axis 4a and the catch-switching-lever axis 5a to be arranged parallel to one another, this making it possible to realise a particularly flat locking-mechanism arrangement 8.

It is possible for the lever system 7 to form a toggle-lever mechanism 17, by means of which the catch 4 can be additionally secured in its engagement position. As an alternative, or in addition, it is also possible for the lever system 7 and the catch 4 together to form a toggle-lever mechanism 17, by means of which the catch 4 is additionally secured in its engagement position, as is shown in FIG. 2b). Such a mechanism, in respect of which the catch 4 is mounted pivotably on a lever 18 of the lever system 7, straightforwardly allows the catch 4 to be retained in a stable state in its engagement position and this stable position to be straightforwardly released, in particular with a small amount of force being applied, by the lever system 7 being actuated.

The invention claimed is:

1. A motor-vehicle lock which is intended for a closure element of a motor vehicle and comprises:
   a locking-mechanism arrangement), wherein the locking-mechanism arrangement has, as its functional elements, a latch, a catch and a catch-switching lever, wherein the latch is configured to be pivoted into at least one locking position in each of which the latch is retained in engagement with a locking part, and into an open position, in which it frees the locking part, wherein the catch is configured to be pivoted into an engagement position, in which the latch located in the respective locking position is locked by the catch so that it cannot pivot in its opening direction, and a disengagement position, in which the catch frees the latch in its opening direction, and wherein the catch-switching lever is configured to be pivoted into an actuating position, in which a sensor is activated by the catch-switching lever, and into a neutral position, in which the sensor is not actuated by the catch-switching lever, wherein the locking-mechanism arrangement has a common spring element, and wherein the common spring element is arranged such that the spring element exerts a spring force on the latch, the catch and the catch-switching lever; and wherein the common spring element is arranged such that the spring element exerts a spring force on the latch in the direction of its opening position, on the catch in the direction of its engagement position and on the catch-switching lever in the direction of the catch.

2. The motor-vehicle lock according to claim 1, wherein the catch-switching lever is designed in the form of a multifunctional part which, in addition to performing a switching function in relation to the sensor for establishing the catch position, causes force to be transmitted from the spring element to the catch and provides support for the spring element.

3. The motor-vehicle lock according to claim 1, wherein the spring element is supported, on the one hand, on the latch and, on the other hand, on the catch-switching lever such that the latch and the catch-switching lever are prestressed in relation to one another.

4. The motor-vehicle lock according to claim 1, wherein the latch is prestressed into its open position, and wherein the catch is prestressed into its engagement position.

5. The motor-vehicle lock according to claim 1, wherein the force generated by the common spring element, and acting on the catch and the latch, decreases as opening of the latch increases.

6. The motor vehicle lock according to claim 1, wherein the at least one locking position comprises a main locking position and a preliminary locking position.

7. The motor-vehicle lock according to claim 4, wherein the catch-switching lever is prestressed into its actuating position.

8. The motor vehicle lock according to claim 1, wherein the common spring element is arranged such that the spring force is transferred from the latch to the catch via the catch-switching lever.

* * * * *